UNITED STATES PATENT OFFICE.

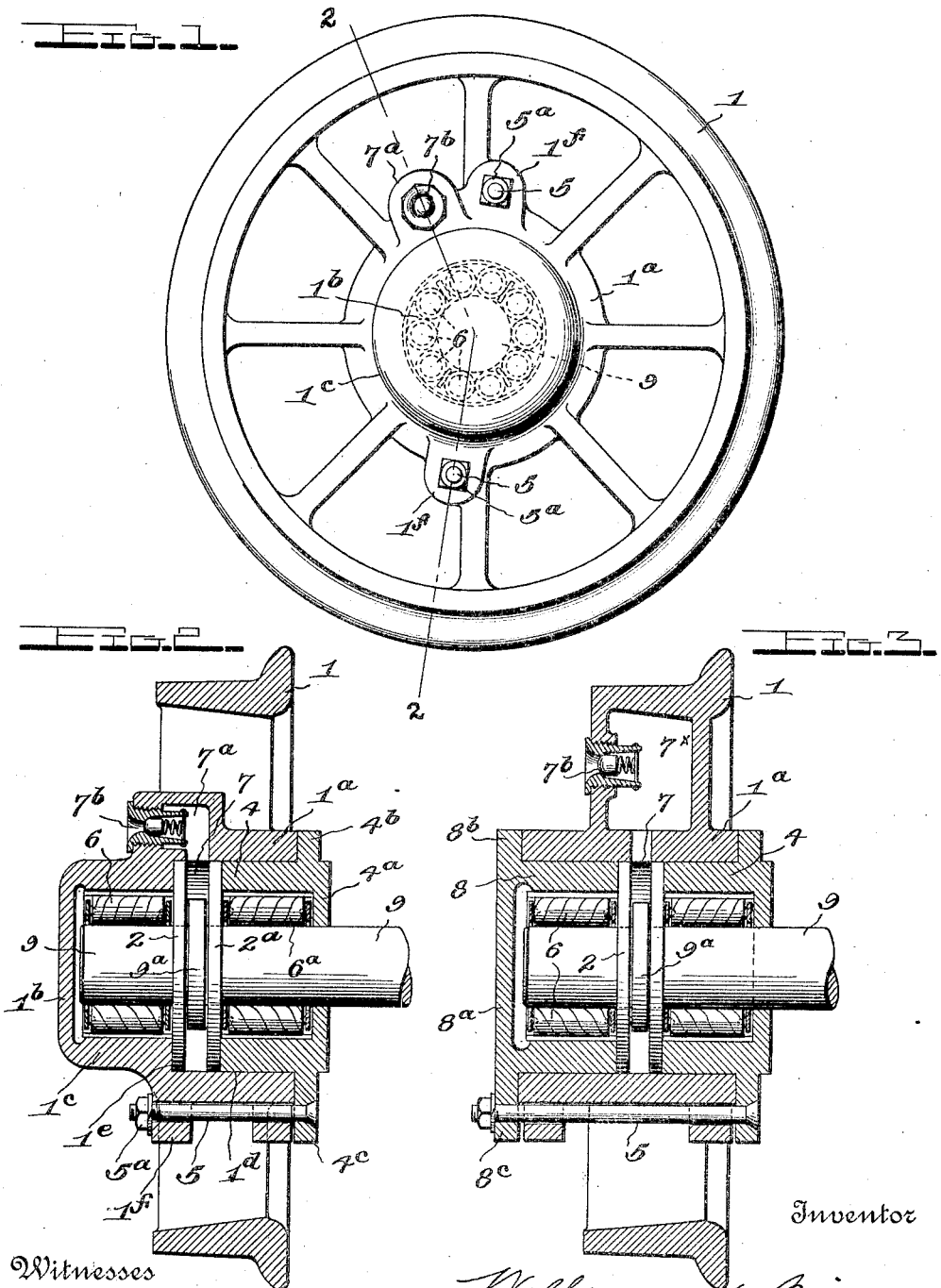

WILLIAM H. BINES, OF BARNESVILLE, OHIO, ASSIGNOR OF ONE-HALF TO ANDREW J. BAGGS, OF BARNESVILLE, OHIO.

MINE-CAR WHEEL.

1,088,519.  Specification of Letters Patent.  Patented Feb. 24, 1914.

Application filed December 3, 1913. Serial No. 804,410.

*To all whom it may concern:*

Be it known that I, WILLIAM H. BINES, a citizen of the United States, residing at Barnesville, in the county of Belmont and State of Ohio, have invented certain new and useful Improvements in Mine-Car Wheels; and I hereby declare that the following is a full, clear, and exact description thereof, reference being had to the accompanying drawings, which form part of this specification.

This invention is a novel improvement in so-called mine car wheels, and its object is to provide a wheel with self-contained roller bearings upon the axle, and which can be readily attached to and detached from the axle, and any broken parts can be easily and cheaply replaced; and in which longitudinal thrust of the wheel on the axle or axle against the wheel will be amply provided for, and the bearings will be thoroughly lubricated.

I will explain the invention with reference to the accompanying drawings which illustrate practical embodiments of the invention, and in which—

Figure 1 is a front elevation of the present preferred form of wheel. Fig. 2 is a vertical section on line 2—2, Fig. 1. Fig. 3 is a view similar to Fig. 2 showing a modified embodiment of the invention.

The wheel 1 may be a web or spoke wheel, and is shown as a spoke wheel. It has a hub $1^a$ the bore of which is of larger diameter than the axle 9. In the construction shown in Fig. 1 the outer end of the hub is closed by a cap $1^b$ preferably formed integral with the hub, and the front portion $1^c$ of the bore of the hub is of smaller diameter than the rear portion $1^d$ thereof; an annular shoulder $1^e$ being formed in the hub at the junction of the portions $1^c$, $1^d$. The axle 9 extends axially into the hub but its outer end does not contact with the inner wall of cap plate $1^b$; and to prevent such contact the axle 9 is provided with an annular thrust collar $9^a$ which when the wheel is in position on the axle lies about in the median line of the hub; and between this flange $9^a$ and the annular shoulder $1^e$ is interposed an annular thrust plate 2 by which the inward thrust of the wheel, or the outward thrust of the axle is transmitted from the wheel to the collar $9^a$.

Within the inner portion $1^d$ of the bore of the hub is fitted a removable annular bushing 4 which corresponds in external diameter to the internal diameter of the portion $1^d$ of the bore of the hub; and its internal diameter is greater than that of the axle 9. This bushing 4 has an outer end plate $4^a$ preferably formed integral therewith and apertured for the passage of the axle 9, as shown. The bushing 4 also preferably has a radially projecting flange $4^b$ which is fitted against the inner end of the hub, and said flange may be provided with perforated ears $4^c$ that may be engaged by bolts 5 which transfix said ears and corresponding perforated portions $1^f$ of the hub, and said bolts are secured by nuts $5^a$ or other suitable means, so as to rigidly fasten the bushing 4 to the hub.

In practice in order to enable the bushing 4 to be made in one solid casting the shaft can be divided longitudinally or made in two sections so that the bushing 4 can be slipped onto the shaft 9 from the inside of the flange $9^a$. An annular thrust plate $2^a$ is interposed between the flange $9^a$ and the inner end of the bushing 4 so as to take up the outward thrust of the wheel, or the inward thrust of the axle on the wheel; the flange $9^a$ being interposed between the thrust plates 2, $2^a$.

Surrounding the axle within the bore $1^c$ is a series of anti-friction bearings 6 which may be of any suitable type but I preferably use the so-called "Hyatt roller bearings"; and a similar set of anti-friction bearings $6^a$ are placed between the axle 9 and the bushing 4 at the inner side of the thrust plate $2^a$. It will be seen that with this construction the wheel has substantial roller bearings upon the axle so that friction is obviated; also that ample thrust bearings are provided by the collar $9^a$ on the axle and the thrust plates 2, $2^a$ and the hub. These interior parts may be thoroughly lubricated by filling the annular chamber 7 in the hub between the plates 2, $2^a$ with oil; and said chamber communicates with an oil reservoir $7^a$ at the side of the hub to which oil can be supplied through an opening closed by a valve $7^b$ of ordinary construction.

In the construction shown in Fig. 3 the hub is made of the same internal diameter throughout, and in the outer end of the hub,—at the outer side of the bearing plate 2 and flange $9^a$,—is secured a removable annular bushing 8, which is constructed substantially like the inner bushing 4; such outer bushing 8 being provided with a flange 8ᵇ and perforated lugs 8ᶜ corresponding to the flange 4ᵇ and lugs 4ᶜ of the bushing 4; and the bolts 5 transfix the lugs 4ᶜ, 8ᶜ and secure both bushings in position; in this construction the outer set of roller bearings 6 are arranged within the bushing 8 just as the inner set of roller bearings 6ᵃ are arranged within the bushing 4; the outer end of the bushing 8 is preferably closed by an integral imperforate plate 8ᵃ.

In the construction shown in Fig. 3 a larger oil reservoir 7ˣ is shown which may be formed by inclosing a space between two adjacent spokes of the wheel. With this construction the outer bushing can be removed without taking the wheel off the axle.

What I claim is:

1. In combination, an axle having a thrust collar, a wheel having a hub bored to permit the entrance of said collar, a bushing surrounding the shaft within the inner end of said hub, and anti-friction bearings within the hub and surrounding said shaft at opposite sides of said collar.

2. In combination, an axle having a thrust collar, a wheel having a hub bored to permit the entrance of said collar, a bushing surrounding the shaft within the inner end of said hub, and annular thrust plates within the hub at opposite sides of said collar.

3. In combination, an axle having a thrust collar, a wheel having a hub bored to permit the entrance of said collar, a bushing surrounding the shaft within the inner end of said hub, annular thrust plates within the hub at opposite sides of said collar, and roller bearings within the hub and bushing and surrounding said shaft at opposite sides of said collar.

4. In combination, an axle having a collar adjacent its end, a wheel having a hub bored to fit over said collar, means engaging said collar to prevent inward movement of the wheel on the axle, and a removable bushing in the hub at the inner side of the collar to prevent outward movement of the wheel on the axle; anti-friction bearings surrounding the shaft at opposite sides of the collar within the hub one set of said bearings being within the said bushing.

5. In combination, an axle having a thrust collar, a wheel having a hub provided with a bore of larger diameter than said collar, annular thrust plates on said axle at opposite sides of said collar and within the bore of the hub, and sets of roller bearings within the hub and surrounding the shaft at opposite sides of the collar and thrust plates.

6. In combination, an axle having a thrust collar, a wheel having a hub provided with a bore of larger diameter than said collar, annular thrust plates on said axle at opposite sides of said collar and within the bore of the hub, sets of roller bearings within the hub and surrounding the shaft at opposite sides of the collar; and a removable bushing secured to the inner end of the hub and interposed between the adjacent roller bearings and inner wall of the hub.

7. In combination with a wheel having a hub, an axle having a thrust collar within the hub; removable cylindric bushings fitted on the shaft and within the hub at opposite sides of the thrust collar, means for detachably attaching the bushings to the hub; and roller bearings interposed between the shaft and the said bushings.

8. In combination with a wheel having a hub, an oil reservoir communicating with the bore of the hub; an axle having a thrust collar on its end within the hub; removable cylindric bushings fitted on the shaft within the hub, at opposite sides of the collar, and means for detachably attaching the bushings to the hub; thrust plates interposed between the collar and the said bushings; and anti-friction bearings interposed between the shaft and the bearings.

In testimony that I claim the foregoing as my own, I affix my signature in presence of two witnesses.

WILLIAM H. BINES.

Witnesses:
J. W. CHAPPELL,
W. O. CHAPPELL.

---

Copies of this patent may be obtained for five cents each, by addressing the "Commissioner of Patents, Washington, D. C."